Aug. 29, 1944.  H. KLEMPERER  2,356,765

WELDING SYSTEM

Filed Oct. 23, 1942

INVENTOR.
HANS KLEMPERER,
BY Elmer J. Gorn
ATTY.

Patented Aug. 29, 1944

2,356,765

UNITED STATES PATENT OFFICE 2,356,765

WELDING SYSTEM

Hans Klemperer, Belmont, Mass., assignor to Raytheon Manufacturing Company, Newton, Mass., a corporation of Delaware Application October 23, 1942, Serial No. 463,301

11 Claims. (Cl. 320—1)

This invention relates to resistance welding systems in which electric energy is stored in a condenser and then discharged through a transformer having a magnetic core to deliver welding current to a resistance welding load. In systems of this kind there is often a relatively long period of decay of the current. The relatively long period required for the decay of the current limits the speed with which successive welding operations may be made. If the welding electrodes are separated from the work which they are welding while any current is still flowing through the welding load sparking and sputtering of the electrode material on the work may occur with consequent damage to the work. For these and various other purposes it is often desirable to stop the current flow in the welding load in a shortened period of time.

An object of this invention is the provision of a relatively simple improved system of the type indicated in which the decay current in the load circuit is terminated in a shortened period of time.

In systems of the type hereinabove described particularly where each pulse of current supplied to the primary winding has a considerable direct current component, the problem of saturation of the transformer core becomes particularly troublesome. To prevent such saturation it has been necessary to use a relatively large amount of core material.

Another object of this invention is the provision of an improved arrangement whereby direct current is supplied to the transformer to reset the residual flux in the transformer to zero or preferably to a value opposite that of said residual flux.

A further object of the present invention is the provision in a system of the type indicated of a simple arrangement for both cutting off the decay current and resetting the flux.

A still further object of the present invention is the provision of a relatively simple and inexpensive system of the type described.

Figure 1:
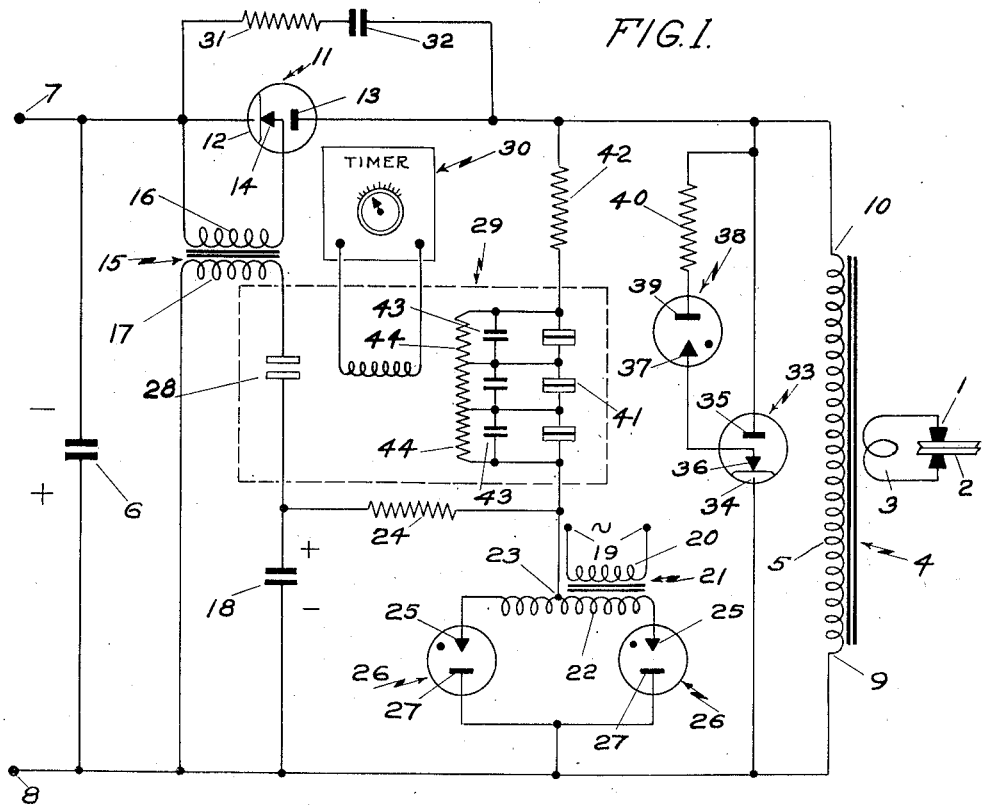
Figure 2:
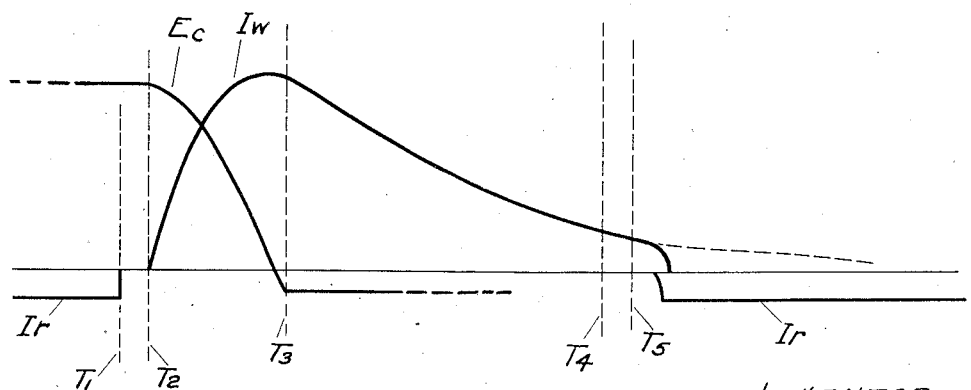

Other and further objects of the present invention will become apparent and the foregoing will be best understood from the following description of an exemplification thereof, reference being had to the drawing in which Fig. 1 is a schematic diagram of a resistance welding system embodying my invention; and Fig. 2 is a set of curves which depicts in a general qualitative way certain aspects of the operation of the system of Fig. 1. These curves are not intended to represent quantitatively the mode of operation of this system.

Referring now to Fig. 1, a pair of resistance welding electrodes 1 are adapted to engage a piece of work 2 which is to be welded. The electrodes 1 are supplied with energy from the secondary 3 of a welding transformer 4 having a magnetic core and a primary 5. Energy is supplied to the primary 5 of welding transformer 4 by the discharge of a relatively large condenser 6. Condenser 6 is adapted to be charged from any suitable source of direct current, such as, for example, a direct current generator, rectifier, or the like, and for this purpose may have its negative side connected to one input terminal 7 and its positive side connected to another input terminal 8.

Condenser 6 is adapted to be discharged through the primary 5 of welding transformer 4 by having its positive side connected to one end 9 of primary winding 5, and its negative side connected to the other end 10 of the primary winding 5 through a controlled ignition discharge tube 11. Tube 11 is preferably of the pool cathode type with an igniter for initiating a cathode spot on the pool in order to cause the tube to conduct current. Tube 11 is provided with a pool cathode 12, preferably of mercury, connected to the negative side of condenser 6, and with an anode 13 connected to end 10 of the primary 5. Tube 11 is also provided with an igniter 14. This igniter may be of any suitable type, preferably a resistance type igniter made of a semi-conducting material, such as, for example, boron-carbide or silicon-carbide.

In order to supply the igniter 14 with an igniting impulse for firing tube 11 and thereby discharging condenser 6 through the primary 5 of the welding transformer 4, an igniting transformer 15 is provided having one end of its secondary 16 connected to the igniter 14 and the other end thereof connected to the cathode 12. The primary 17 of igniting transformer 15 is adapted to be supplied with a pulse of current for igniting purposes from a condenser 18. While condenser 18 may be charged from any suitable source of direct current, I prefer to utilize the following.

A source of alternating current may be connected to a pair of input terminals 19, which in turn are connected to the primary 20 of a transformer 21 having a secondary 22 with a center tap 23. The center tap 23 is connected through a current limiting resistance 24 to the positive side of condenser 18. The ends of secondary winding 22 are connected respectively to the cathodes 25 of a pair of rectifying tubes 26 which are preferably of the gaseous type each having a permanently energized cathode. The anodes 27 of tubes 26 are connected together and to the negative side of condenser 18. It will be seen that we have thereby provided a full-wave rectifying system for charging condenser 18. For controlling the discharge of condenser 18 into the primary 17 of igniting transformer 15 to thereby control the firing of tube 11, I prefer to connect the negative side of condenser 18 to one end of the primary 17 and the positive side of condenser 18 through the forward contacts 28 of a relay 29 to the other end of primary 17. The forward contacts 28 of relay 29 remain open until said relay is energized, whereupon said contacts close and discharge condenser 18 to thereby provide an igniting impulse to fire tube 11. The energizing of relay 29 is controlled by a timer 30 which may be of any of the types well known in the art which are suitable for this purpose.

To insure firing of tube 11 I prefer to utilize a pick-up circuit consisting of an impedance 31 in series with a condenser 32, which circuit is arranged between the anode 13 of the cathode 12 of tube 11. This pick-up circuit is particularly desirable where rapid operation is sought.

When tube 11 is fired condenser 6 discharges through the primary 5. In order to enable the current in primary 5 to exponentially decay, I prefer to arrange a controlled ignition discharge tube 33 in shunt across said winding 5. Tube 33 may be similar in type to tube 11 and preferably has its pool cathode 34 connected to end 9 of primary 5 and its anode 35 connected to end 10 of primary 5. Tube 33 is provided with an igniter 36. To fire tube 33 I prefer to connect the igniter 36 of said tube to the cathode 37 of a rectifier tube 38 which has its anode 39 connected in series with the current limiting resistance 40 to the end 10 of primary winding 5. Tube 38 may be a gaseous tube having a cathode of the continuously energized type.

To provide for a shortened period for the decay of current through the welding load and to reset the flux, I prefer to utilize the full-wave rectifying system which has heretofore been described as being utilized to charge condenser 18. For this purpose I prefer to connect the anodes 27 of tubes 26 to end 9 of primary 5. The center tap 23 of the secondary 22 of transformer 21 is connected through a set of back contacts 41 in the relay 29 and through a current limiting resistance 42 to end 10 of primary 5. To prevent sparking when the back contacts 41 open, I prefer to arrange a plurality of condensers 43 each in shunt with a resistance 44, in shunt across each of the back contacts 41. The resistances 44 are provided for the purpose of permitting charges to leak off the condensers 43. The back contacts 41 are normally closed and only open when the relay is energized at the proper time by the timer 30.

The method of the operation of this system is as follows: Prior to the closing of the electrodes 1 on the work 2, relay 29 is deenergized and the back contacts 41 are closed, and direct current from the full-wave rectifier system flows through said contacts, current limiting resistance 42, and primary 5 of the welding transformer 4 from end 10 thereof to end 9 and then back to the anodes 27 of rectifying tube 26. The flow of this direct current through primary winding 5 is in such a direction that it resets the flux in transformer 4 in a vectorial direction inverse to the direction of the flux produced when condenser 6 discharges through said transformer to produce a weld. In Fig. 2, curve $I_r$ represents the direct current flow through the primary 5 which resets the flux. It is preferred that this current have a sufficient value to bring the core of said transformer 4 substantially up to its saturation value, but it is of course to be understood that the vectorial direction of this saturation is inverse to the saturation which might be produced by current from the discharge of condenser 6. After the electrodes 1 engage the work 2 the timer 30 is set in motion and at a given time $T_1$ energizes the relay 29, whereupon back contacts 41 open and the forward contact 28 closes during the time interval between $T_1$ and $T_2$. The time interval between $T_1$ and $T_2$, which may be of the order of a few thousandths of a second, is so small that the core of transformer 4 is still substantially magnetized in said inverse direction at the time tube 11 is fired. This time interval also serves to assure that the circuit containing the full-wave rectifier is completely disconnected before tube 11 is fired so that none of the discharge current from condenser 18 enters said rectifier. The life of the tubes of the rectifier is thereby not impaired.

When forward contact 28 closes, condenser 18 discharges through the primary 17 of igniting transformer 15 thereby firing tube 11. Condenser 6 thereupon discharges through primary 5. This discharge of condenser 6 begins at time $T_2$ and at that time the voltage across the condenser, $E_c$, is at a maximum. As the voltage on the condenser declines, the current supplied to the welding load increases so that when this current is at a maximum the voltage on the condenser has reached a zero value. As the current supplied to the welding load starts to decline the current across the condenser reverses. When, at time $T_3$, this reverse potential on the condenser reaches a given value rectifying tube 38 will conduct and thereby supply an igniting impulse to the igniter 36 of tube 33. Tube 33 thereupon conducts, and since the drop in tube 33 is less than the drop in tube 38, tube 38 ceases to conduct. The welding current $I_w$ starts to decay exponentially. The current decays in the primary winding until a time, $T_4$, when it reaches a point at which it is insufficient to support further conduction of tube 33, and tube 33 goes out. At a given time thereafter, $T_5$, when the welding current in the secondary is relatively low which time may be selected by suitably adjusting timer 30, relay 29 is deenergized whereupon the front contact 28 opens and the back contacts 41 again close. Upon closing of the back contacts 41 direct current from the full-wave rectifier which is in a direction inverse to the decaying current in the primary 5 is supplied to said primary. This direct current $I_r$ abruptly terminates the decaying welding current $I_w$ instead of permitting it to slowly decay as indicated by the dotted line extension of $I_w$. The continued flow of this direct current also resets the flux so as to magnetize the core of welding transformer 4 in a direction inverse to that produced by the current supplied from condenser 6. This direct current flow $I_r$ continues until the next welding operation in which the steps hereinabove described are repeated.

It will be seen that after $T_5$ when the back contacts 41 again close and the welding current is abruptly terminated the electrodes 1 may be separated from the work without sparking since the current in the primary 5 is a steady current. It will also be seen that because of this abrupt termination of the decaying welding current more rapid operation may be produced without overlapping of welding impulses. Furthermore, it will be seen that saturation is prevented by the resetting of the flux by this direct current. Because of the fact that the core of the welding transformer 4 is magnetized in an inverse direction, there will be less tendency for the current from condenser 6 to saturate said core, and it therefore becomes feasible to use less core material than would otherwise be required. The arrangement and means for resetting the flux and for foreshortening the decay of the welding current is relatively simple and inexpensive as compared, for example, with systems which perform either of these two functions utilizing controlled electric space discharge devices. This system here described is relatively simple, positive in its operation and less likely to get out of order.

While I have described the details of one specific embodiment of my invention it is of course to be understood that various modifications may be made therein without departing from the teachings hereof. For example, a different source of direct current than the full-wave rectifying system here described may be employed. Various types of relays may be substituted in place of the relay 29 which will perform the same function. Instead of a single condenser 6 a plurality of such condensers may be utilized. In view of the modifications which may be made without departing from the spirit of my invention it is desired that the appended claims be given a broad interpretation commensurate with the scope of this invention within the art.

What is claimed is:

1. An electrical system comprising a transformer provided with input and output connections, an output circuit connected to the output of said transformer, means for supplying to the input of said transformer a pulse of current having a substantial direct current component for individual operation whereby a corresponding pulse of current appears in said output circuit, and means operative when said pulse of current in the output circuit has fallen to a relatively low value for supplying current to the input of said transformer in a direction opposite to the pulse of current supplied to the input of the transformer whereby the decrease of said pulse of current in the output circuit is rapidly accelerated.

2. An electrical system comprising a transformer provided with input and output connections, an output circuit connected to the output of said transformer, means for supplying to the input of said transformer a pulse of current having a substantial direct current component for individual operation whereby a corresponding pulse of current appears in said output circuit, and a source of direct current, and means for connecting said source to the input of said transformer in a direction opposite to the pulse of current supplied to the input of said transformer when the pulse of current in the output circuit has fallen to a relatively low value whereby the decrease of said pulse of current in the output circuit is rapidly accelerated.

3. An electrical system comprising a transformer provided with input and output connections, an output circuit connected to the output of said transformer, an input circuit for supplying to the input of said transformer a pulse of current having a substantial direct current component for individual operation whereby a corresponding pulse of current appears in said output circuit, a source of direct current, and a connecting circuit for connecting said source to the input of said transformer in a direction opposite to the pulse of current supplied to the input of said transformer, a relay having at least one front and one back contact, the energizing of said relay closing the front contact and opening the back contact, said relay being arranged so that closing of the front contact establishes said input circuit and closing of the back contact establishes said connecting circuit, and timing means for energizing said relay to establish said input circuit and adapted to deenergize said relay when the pulse of current in the output circuit has fallen to a relatively low value whereby the decrease of said pulse of current in the output circuit is rapidly accelerated.

4. An electrical system comprising a transformer provided with input and output connections, an output circuit connected to the output of said transformer, an input circuit for supplying to the input of said transformer a pulse of current having a substantial direct current component for individual operation whereby a corresponding pulse of current appears in said output circuit, said input circuit including an electrical space discharge device adapted to establish said circuit upon conduction thereof, and another electrical space discharge device arranged in shunt across the input of the transformer and adapted upon conduction thereof to enable exponential decay of said pulse of current, means operative when said pulse of current in the output circuit has fallen to a relatively low value and said electrical space discharge devices have ceased to conduct for supplying current to the input of said transformer in a direction opposite to the pulse of current supplied to the input of the transformer whereby the decrease of said pulse of current in the output circuit is rapidly accelerated.

5. An electrical system comprising a transformer having a magnetic core and provided with input and output connections, an output circuit connected to the output of said transformer, an input circuit for supplying to the input of said transformer a pulse of current having a substantial direct current component for individual operation whereby a corresponding pulse of current appears in said output circuit and the flux in said core is set in one direction, and means operative when said pulse of current in the output circuit has fallen to a relatively low value for supplying current to the input of said transformer in a direction opposite to the pulse of current supplied to the input of the transformer whereby the decrease of said pulse of current in the output circuit is rapidly accelerated and whereby the flux in said magnetic core is reset in a direction inverse to the direction in which it is set by the pulse of current in the input circuit.

6. An electrical welding system comprising a welding transformer provided with input and output connections, an output circuit connected to the output of said transformer including a resistance welding load, means for supplying to the input of said transformer a pulse of current while said output circuit is closed through said load, said pulse having a substantial direct current component for individual operation whereby a corresponding pulse of current appears in said output circuit, and means operative when said pulse of current in the output circuit has fallen to a relatively low value and while said output circuit is still closed for supplying current to the input of said transformer in a direction opposite to the pulse of current supplied to the input of the transformer whereby the decrease of said pulse of current in the output circuit is rapidly accelerated.

7. An electrical welding system comprising a welding transformer having a magnetic core and provided with input and output connections, an output circuit connected to the output of said transformer including a resistance welding load, means for supplying to the input of said transformer a pulse of current while said output circuit is closed through said load, said pulse having a substantial direct current component for individual operation whereby a corresponding pulse of current appears in said output circuit and the flux in said core is set in one direction and means operative when said pulse of current in the output circuit has fallen to a relatively low value and while said output circuit is still closed for supplying current to the input of said transformer in a direction opposite to the pulse of current supplied to the input of the transformer whereby the decrease of said pulse of current in the output circuit is rapidly accelerated and whereby the flux in said magnetic core is reset in a direction inverse to the direction in which it is set by the pulse of current in the input circuit.

8. An electrical welding system comprising a welding transformer having a magnetic core and provided with input and output connections, an output circuit connected to the output of said transformer including a resistance welding load, and means for impressing on said core a magnetomotive force in one direction while said output circuit is open and adapted to become inoperative after said output circuit is closed, and an input circuit for supplying to the input of said transformer a pulse of current after said output circuit is closed through said load, said pulse having a substantial direct current component for individual operation whereby a corresponding pulse of current appears in said output circuit, the direction of said pulse of current being such as to generate a magnetomotive force inverse to said first-mentioned magnetomotive force, said means being adapted to become inoperative before said input circuit supplies a pulse and to again become operative after the pulse of current in the output circuit has fallen to a relatively low value and while said output circuit is still closed to thereby rapidly accelerate the decrease of the pulse of current in the output circuit and to reset the flux in the magnetic core.

9. In a resistance welding system a transformer, a primary circuit, a secondary circuit including a resistance welding load, energy storage means for supplying energy to said transformer, means to supply a constant direct current through the primary of said transformer to establish a predetermined magnetic flux therein, timing means for interrupting said supply of direct current to said transformer while said secondary circuit is closed through said load and thereupon discharging energy from said energy storage means through the primary of said transformer in a direction inverse to the previous flow of direct current therethrough.

10. In a resistance welding system a transformer having a primary circuit and a secondary circuit including a resistance welding load, energy storage means for supplying energy to said transformer, means to supply a constant direct current through the primary of said transformer to establish a predetermined magnetic flux therein, timing means for interrupting said supply of direct current to said transformer and thereupon discharging energy from said energy storage means through the primary of said transformer in a direction inverse to the previous flow of direct current therethrough, means effective on a reversal of potential of said energy storage means to disconnect the same from said primary and simultaneously shunt the primary through a low impedance circuit to effect a gradual decay of the energy in the system including said transformer, means for supplying constant direct current through said primary in a direction inverse to said decay current after said decay current has reached a predetermined low value and while said secondary circuit is still closed through said resistance welding load.

11. In a resistance welding system a transformer having a primary circuit and a secondary circuit including a resistance welding load, energy storage means for supplying energy to said transformer, means to supply a constant direct current through the primary of said transformer to establish a predetermined magnetic flux therein, timing means for interrupting said supply of direct current to said transformer while said secondary circuit is closed through said load and thereupon discharging energy from said energy storage means through the primary of said transformer in a direction inverse to the previous flow of direct current therethrough, means effective on a reversal of potential of said energy storage means to disconnect the same from said primary and simultaneously shunt the primary through a low impedance circuit to effect a gradual decay of the energy in the system including said transformer, means for supplying constant direct current through said primary in a direction inverse to said decay current after said decay current has reached a predetermined low value and while said secondary circuit is still closed through said resistance welding load.

HANS KLEMPERER.